V. O. KLINGLER.
SCALE.
APPLICATION FILED APR. 2, 1910.
1,015,190.
Patented Jan. 16, 1912.
3 SHEETS—SHEET 2.
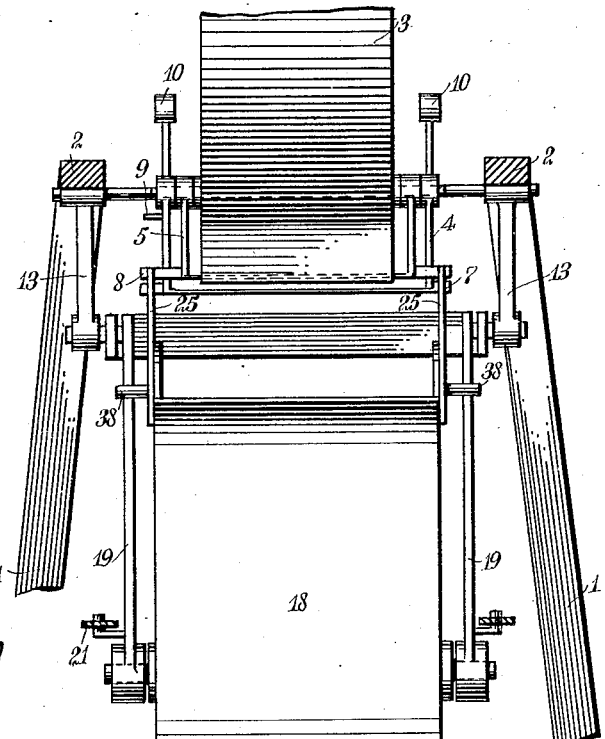
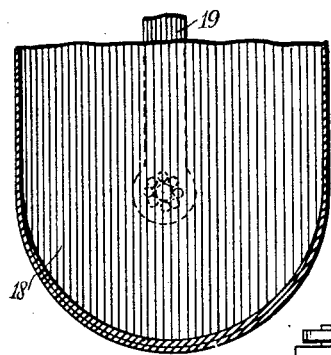
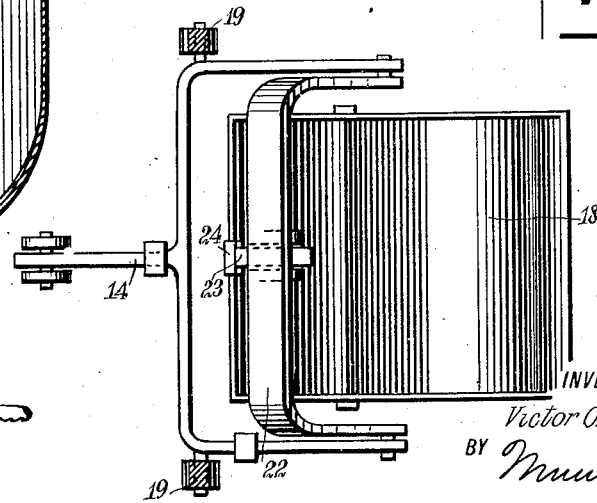
WITNESSES:
INVENTOR
Victor O. Klingler
BY
ATTORNEYS V. O. KLINGLER.
SCALE.
APPLICATION FILED APR. 2, 1910.
1,015,190.
Patented Jan. 16, 1912.
3 SHEETS—SHEET 3.
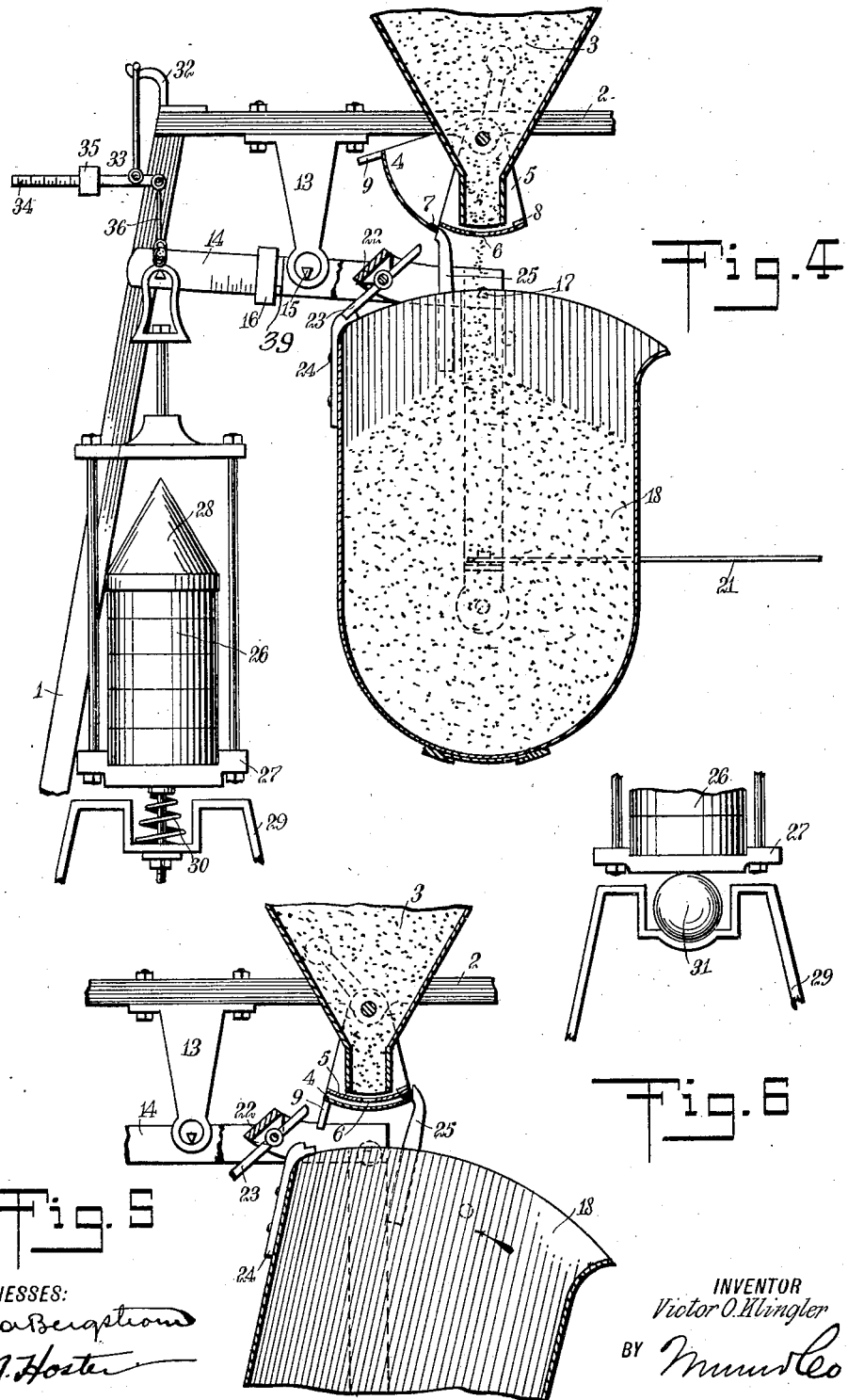

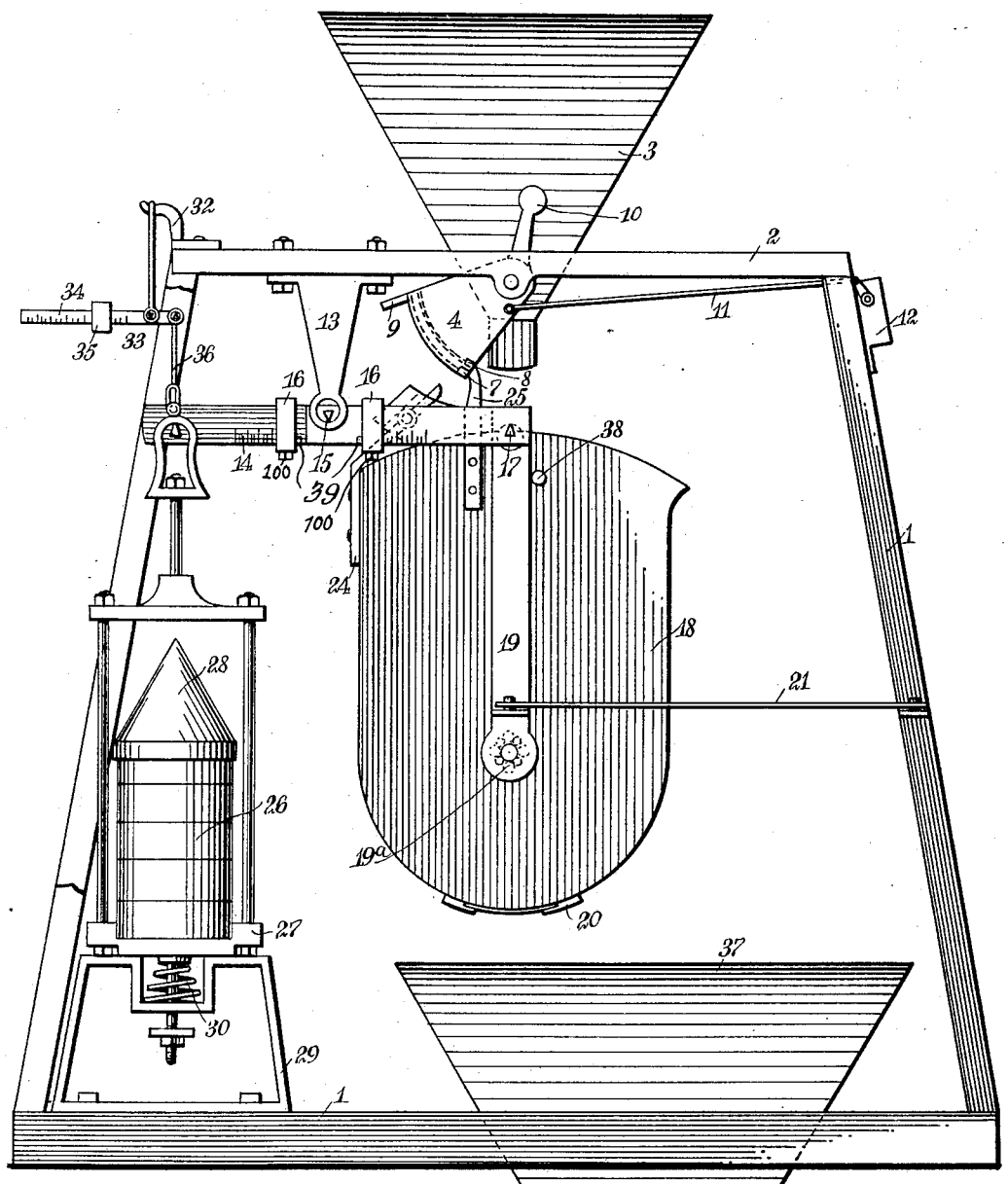

UNITED STATES PATENT OFFICE.

VICTOR O. KLINGLER, OF SLAYTON, MINNESOTA.

SCALE.

1,015,190.  Specification of Letters Patent.  Patented Jan. 16, 1912.

Application filed April 2, 1910. Serial No. 552,977.

*To all whom it may concern:*

Be it known that I, VICTOR O. KLINGLER, a citizen of the United States, and a resident of Slayton, in the county of Murray and State of Minnesota, have invented a new and Improved Scale, of which the following is a full, clear, and exact description.

My invention relates to scales, more particularly to beam scales, and has for an object to provide an automatic scale for weighing large quantities of grain or the like, the operation of the scale being entirely automatic and self-controlled.

For the purpose mentioned, use is made of a frame provided with a scale beam, a tiltable bucket mounted on the scale beam, a hopper on the frame over the bucket, a closure on the hopper, means on the bucket adapted to engage the closure to operate the same when the bucket is tilted, locking means for releasably holding the bucket in upright position, and means engaging the said closure for registering the number of times that the bucket is tilted.

Reference is to be had to the accompanying drawings, forming a part of this specification, in which similar characters of reference indicate corresponding parts in all the figures, and in which—

Figure 1 is a side elevation of my scale in its normal position; Fig. 2 is a partial end view of the same; Fig. 3 is a plan view of the bucket and adjacent operative parts; Fig. 4 is a partial sectional side view showing the bucket almost filled and one of the closure members in position to partially cut off the supply to the bucket; Fig. 5 is a partial sectional side view of a portion of my device and showing the same in the act of tilting, the supply to the bucket being entirely cut off; Fig. 6 is a fragmentary view of a part of the frame and disclosing a rubber bumper which can be employed in place of the spring bumper shown in Fig. 4, beneath the counter-balance; and Fig. 7 is a sectional side view of a portion of the bucket of my device, showing the ball bearing mounting and the weighted under side of the bucket.

In a large number of automatic scales now in use, it is practically impossible to obtain correct results, the variations of the same being in most cases due to friction caused by the various operative parts. Furthermore, the intricate combination of machinery combined with the method of operating the scales, are not only confusing and ineffectual but the scales themselves are utterly impractical in commercial usage.

In the following description of my automatic scale will be disclosed a reliable, simple, effective and easily operated scale for use in measuring or weighing large quantities of various materials, but more particularly for use in weighing grain.

Referring more particularly to the various figures, I employ a frame 1, provided with upper cross bars 2, on which is mounted a hopper 3, similar in shape to a funnel and having the conveying portion downwardly disposed. Valves or closure members 4, 5 are mounted on both sides of the hopper 3, one of the valves having a hole 6 therein, while the other is solid and the said valves 4, 5 are provided with stop lugs 7, 8, a projecting lug 9 and balance weights 10. A rod 11 is mounted on the valve 4 and engages a tally 12 on the frame 1. On the cross bars 2, depending bearings 13 are mounted, and a scale-beam 14 is provided and mounted intermediate the bearings 13, on a knife edge 15.

Suitable poises 16 adapted for obtaining the desired balance by relatively moving the poises, are mounted on the scale beam 14 which is conveniently provided with graduated scales. Mounted on the end of the scale beam 14 on a knife edge 17 is a bucket 18 depending on suitable side bearing members 19 having a ball bearing 19ª at the point of connection with the bucket 18 so that the bucket can be easily tilted, and the said bucket 18 is preferably weighted at the bottom 20 so that it tends to maintain an upright position when empty. A rod 21 engages the bucket bar 19 and the frame 1 to prevent the bucket bar 19 from swaying when the bucket is tilted.

On the scale beam 14 is mounted an extended frame or hanger 22, and centrally mounted thereon is a locking bar 23 pivoted to the hanger 22 and adapted to normally engage a notched bar 24 on the bucket 18, to temporarily hold the bucket in an upright position; and on the sides of the bucket 18, upwardly projecting bars 25 are mounted and adapted to engage the lugs 7, 8, to open and to hold open the valves 4, 5. On the other end of the scale beam 14 is a weight or counterbalance 26, mounted in a frame 27 and provided with a hood 28 to protect the weight 26. On the frame 1, a block 29 is secured and provided with a spring bumper 30 to act as a cushion for the weight 26. As shown in Fig. 6, a rubber ball 31 or the like, can be provided, mounted in the block 29. A hook 32 is mounted on the frame 1, and dependent therefrom are auxiliary weighing means 33, consisting of a scale-beam 34 provided with a shiftable poise 35 and connected with the scale-beam 14 by a link 36, any suitable proportion between fulcrum members on the two scale beams 14 and 34 being employed.

In the operation of my scale, the bucket and all operative parts are first disposed in the positions shown in Fig. 1. Material such as grain or the like, is then poured into the hopper 3 and passes through the hopper into the bucket 18. When the bucket is almost full, owing to the manner of its mounting, it swings slightly downward and in doing so, the bar 25 is drawn away from the lug 8 on the slide 5 and the valve drops into position beneath the spout of the hopper, and the hole 6 in the valve 5 being of a smaller diameter than the spout of the hopper, the flow of grain into the bucket 18 is greatly decreased, as will be seen by referring to Fig. 4. Now, as the grain continues to fill the bucket, the latter descends until it reaches the point at which it is released to tilt. When the bucket has received the requisite amount of material sufficient to counter balance the weights at the opposite end of the scale beam, the bucket will be in its lowermost position and the bar 25 carried thereby will be moved out of contact with the valve 4 which will fall into a vertical position, due to its weight, thereby permanently closing the mouth of the hopper; as the valve 4 moves to this vertical position the lug 9 at the left end thereof will come into contact with the free end of the locking bar 23 which lies in its path and will move this locking bar so that the opposite end thereof will be brought out of engagement with the notched bar 24 on the bucket, thereby releasing the bucket and permitting it to swing about its bearings 19$^a$ until the contents thereof have been deposited in the bin opening 37. When the bucket is tilted and the contents thereof dumped into the bin, the weight 26 which had gradually been raised when the bucket was filled, drops back to its normal position and the concussion of the weight in returning to its original position is substantially absorbed by the bumper 30.

As a means for correcting any shortage or overweight, the poises 16 are provided to slide on the scale beam 14 and suitable stop lugs 39 are secured to the scale beam and against which the poises are adapted to abut, the said stop lugs being disposed equal distances from the knife edge 15. The weight 26 is adjusted to a given amount which is equal to the weight of material which it is desired to place in the bucket 18 and the poises 16 are in the position shown in Fig. 1. Should the bucket contain an excess of this amount of material when it comes into dumping position, due to dribbling or otherwise, the overweight may be determined by moving the left poise 16 to the left until balance is obtained and the reading noted; when the bucket again comes into position to be filled the left poise 16 is moved into the position shown in Fig. 1 and the right hand poise 16 is moved to the right a distance sufficient to compensate for the overweight previously noted by means of the left poise; the right hand poise is secured in this position on the scale beam and subsequent amounts of material in the bucket are thus brought to the desired amount. Should, however, the bucket disclose an under weight by the time it comes into dumping position, this under weight may be determined by moving the right hand poise 16 to the right until balance is obtained and the reading noted. When the bucket is again brought into position to be filled the right hand poise 16 is brought to the position shown in Fig. 1 and the left hand poise is moved to the left a sufficient distance in order to compensate for the amount of under weight and is there secured in position on the beam, thus providing for the increase in material sufficient to make up the desired amount.

It has previously been stated that the lower side of the bucket 18 is provided with weights 20, the bucket itself being rotatable about bearings 19$^a$, which bearings are nearer the bottom of the bucket than the top; the relation between the mass of material below the point 19$^a$ plus the added weight 20 to the mass of material in the bucket above the point 19$^a$ is such that when the bucket 18 is emptied it will tend to return to its normal vertical position. After the bucket is filled with material from the hopper, however, the increased mass in the bucket above the point 19$^a$ is much greater than the material below the point 19$^a$ together with the weight 20 so that the bucket and its contents are in unstable equilibrium and when the bucket is moved slightly to either side of a vertical plane passing through the point 19$^a$ it will tend to overturn, thereby emptying the contents thereof. After the bucket is emptied it will return to the vertical position, as shown in Fig. 1, and in doing so the bar 25 on the bucket will come into engagement with the valves 4 and 5, thereby moving these valves and re-opening the hopper spout and permitting the material to resume its flow into the bucket. As the valves 4, 5 are forced backward, as mentioned, the lug 9 engages the locking bar 23 and causes the same to engage the notched bar 24 to lock the bucket in its upright or normal position, as will be easily seen in Fig. 1. The movement of the valve 4 in swinging back and forth when the bucket is tilted and returned to a normal position, actuates the lever 11, which in turn operates the tally to register each full tilt of the bucket.

It is ofttimes found that when the weight 26 is standardized to weigh a certain quantity of grain each time the operation heretofore described takes place, when the last quantity of grain is to be weighed, it will not quite fill the bucket and the same will not tilt. For this reason the auxiliary scale 33 is provided and when the case is such as mentioned the reading on the auxiliary scale subtracted from the weight 26, will result in the amount of grain in the bucket. In order to prevent the bucket 18 from returning too far when the same tilts back after dumping its contents, a stop lug 38 is provided on the bucket and adapted to engage the hangers 19.

Although I have shown a particular form of device for the purpose of describing my invention, it will be distinctly understood that I do not limit myself to this construction, the scope of my invention being fully defined in the appended claims.

The use of either the spring 30 or rubber bumper 31 which reduces any jar caused by the falling of the weight 26 also provides the further function of controlling to a certain extent the dribble of grain after the first slide has been moved to the position shown in Fig. 4. In this position of the parts the action of the spring 30 or the bumper 31 by bearing against the bottom of the weight moves this weight gradually upward as a balance is approached so that closer accuracy is obtained in the weighing by affecting the dribble of the grain through the steadying effect of this spring on the weight.

Having thus described my invention, I claim as new and desire to secure by Letters Patent:

1. An automatic scale comprising a frame having a hopper thereon, a plurality of valves carried by the frame and adapted to close the mouth of the hopper, a scale beam suitably supported on the said frame and having a bucket pivotally supported thereon adjacent one end thereof, suitable weights adjacent the opposite end of the said beam, a locking bar carried by the scale beam on the bucket end, means on the bucket in engagement with the locking bar, and other means on the bucket in engagement with the valves, whereby when the bucket is brought into normal position under the hopper it is maintained in such position and the valves are removed from the mouth of the hopper, thereby permitting the bucket to receive material from the hopper.

2. An automatic scale comprising a frame having a hopper thereon, a valve carried by the frame and adapted to close the mouth of the hopper, a scale beam suitably supported on the said frame and having a bucket supported thereon adjacent one end thereof, suitable weights adjacent the opposite end of the said beam, a locking means carried by the scale beam adjacent the bucket end, means on the bucket in engagement with the first said means, and other means on the bucket in engagement with the valve, whereby when the bucket is brought into normal position under the hopper it is maintained in such position and the valve is removed from the mouth of the hopper thereby permitting the bucket to receive material from the hopper.

3. An automatic scale comprising a frame having a hopper adjacent thereto, a valve carried by the frame and adapted to close the mouth of the hopper, a scale beam suitably supported on the said frame and having a bucket supported thereon adjacent one end thereof, suitable weights adjacent the opposite end of the said beam, a locking bar carried by the scale beam on the bucket end, a notched bar carried by the bucket in engagement with the said locking bar, and a projecting bar on the bucket in engagement with the valve whereby when the bucket is brought into normal position under the mouth of the hopper it is maintained in such position and the valve is removed from the mouth of the hopper, thereby permitting the bucket to receive material from the hopper.

4. An automatic scale comprising a frame having a hopper adjacent thereto, a valve carried by the frame and adapted to close the mouth of the hopper, a scale beam suitably supported on the said frame and having a bucket supported thereon adjacent one end thereof, suitable weights adjacent the opposite end of the said beam, a locking bar carried by the scale beam on the bucket end, means on the bucket in engagement with the locking bar, and other means on the bucket in engagement with the valve, whereby as material is deposited into the bucket from the hopper the bucket will be moved to a lower position after the weights on the other end of the scale beam have been balanced, the means on the bucket in engagement with the valve being removed therefrom, whereby the valve will move into another position closing the mouth of the hopper, the valve during its travel releasing the locking bar out of engagement with the said means on the bucket whereby the bucket is in position to be tilted.

5. An automatic scale comprising a frame having a hopper suitably supported adjacent thereto, a valve having a lug projecting therefrom carried by the frame and adapted to close the mouth of the hopper, a scale beam suitably supported on the said frame and having a bucket pivotally supported thereon adjacent one end thereof, suitable weights adjacent the opposite end of the said beam, a locking bar carried by the scale beam on the bucket end, a notched bar on the bucket in engagement with the locking bar, and a projecting bar on the bucket in engagement with the valve, whereby as the bucket assumes a lower position due to the weight of material deposited by the hopper therein, the projecting bar will be moved out of engagement with the valve permitting the valve to close the mouth of the hopper, the lug on the valve during the travel of the valve from one position to the other engaging the locking bar and carrying it out of engagement with the notched plate, whereby the bucket is in position to be tilted.

6. An automatic scale comprising a frame having a hopper thereon, a plurality of valves carried by the frame and adapted to close the mouth of the hopper, a scale beam suitably supported on the said frame and having a bucket pivotally supported thereon adjacent one end thereof, suitable weights adjacent opposite ends of the said beam, a resilient member adjacent the lower portion of the said weight and with which the weight is adapted to contact when the bucket is empty, a locking bar carried by the scale beam on the bucket end, means on the bucket in engagement with the locking bar, and other means on the bucket in engagement with the valves, whereby as the bucket becomes full of grain the end of the scale beam from which the bucket is suspended will descend whereby one of the valves is closed, the said weight being in engagement with the said spring whereby the weight is steadied, thereby tending to permit the requisite amount of dribbling before the second valve is closed, whereby the contents of the bucket is more closely determined.

In testimony whereof I have signed my name to this specification in the presence of two subscribing witnesses.

VICTOR O. KLINGLER.

Witnesses:
ARCHIE R. KETZEBACK,
G. H. CHAPMAN.

---

Copies of this patent may be obtained for five cents each, by addressing the "Commissioner of Patents, Washington, D. C."